United States Patent [19]

Höfgen

[11] 4,005,427
[45] Jan. 25, 1977

[54] FACILITY FOR MONITORING THE CARRIER-FREQUENCY AND SIDEBAND SIGNALS RADIATED BY A DVOR GROUND STATION

[75] Inventor: Günter Höfgen, Kornwestheim, Germany

[73] Assignee: International Standard Electric Corporation, New York, N.Y.

[22] Filed: Feb. 11, 1976

[21] Appl. No.: 657,172

[30] Foreign Application Priority Data

Feb. 12, 1975 Germany .......................... 2505723

[52] U.S. Cl. ..................... 343/106 D; 343/100 AP
[51] Int. Cl.² ......................................... G01S 1/44
[58] Field of Search ..... 343/106 D, 106 R, 100 AP

[56] References Cited

UNITED STATES PATENTS 3,818,476  6/1974  Coulter et al. ............. 343/100 AP Primary Examiner—Maynard R. Wilbur
Assistant Examiner—T. M. Blum
Attorney, Agent, or Firm—William T. O'Neil

[57] ABSTRACT

A facility for monitoring in the near field, the carrier-frequency and sideband signals radiated by a DVOR ground station is provided. In a first embodiment the monitor antenna is located outside the circle in the near field, and a controllable phase shifter compensates for the phase shifts caused by the different path lengths between the radiators of the circular array and the monitor antenna. In a second embodiment, the central radiator is used as the monitor antenna. The sideband signals received by this monitor antenna are modulated in a controllable phase shifter whose control is synchronized with the switching sequence of the commutator.

9 Claims, 2 Drawing Figures

4,005,427

FACILITY FOR MONITORING THE CARRIER-FREQUENCY AND SIDEBAND SIGNALS RADIATED BY A DVOR GROUND STATION

BACKGROUND OF THE INVENTION

The present invention relates to a facility for monitoring the carrier-frequency and sideband signals radiated by a DVOR ground station, according to the pre-characterizing clause of claim 1.

A facility of this kind is described in an article by W. J. Crone and H. Popp, "Das Doppler-Drehfunkfeuer", published in the journal "Elektrisches Nachrichtenwesen", Vol. 43, Nov. 2, 1968, on pages 148 to 152.

In the DVOR navigation system, the phases of the carrier and sideband signals radiated by the DVOR ground station are set so that the specified phase relation exists in the far field. To check whether this phase setting in the far field has the correct value, a minimum distance between the DVOR ground station and the monitor antenna of 150 to 200m is necessary for prior art type monitoring facilities. With a smaller distance, the signals radiated by the DVOR ground station can no longer be monitored. Due to the short distance, the paths of the signals radiated by the individual radiators of the the DVOR ground station and picked up by the monitor antenna are not parallel as is the case in the far field. This causes transit-time differences and, consequently, phase distortions.

OBJECT

A monitoring facility is to be provided which permits the distance between the monitor antenna and the DVOR ground station to be shorter than in the prior art.

SOLUTION

This object is attained by the means set forth in the claims.

ADVANTAGE

The monitoring facility in accordance with the invention allows DVOR stations to be installed at sites where installation has so far been impossible because such stations could not be monitored.

DESCRIPTION

The invention will now be explained in more detail and by way of example with reference to the accompanying drawings.

Figure 1:
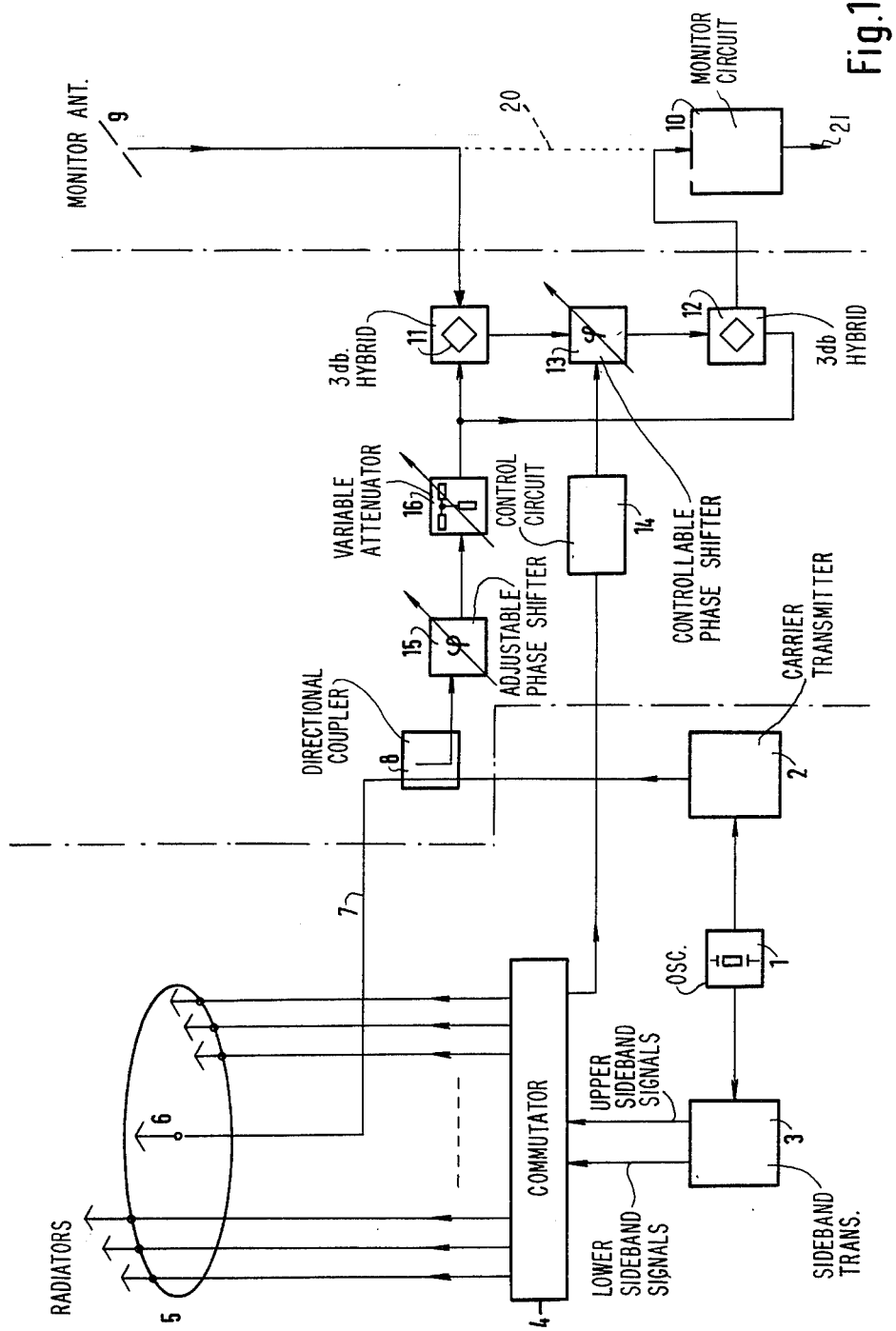
FIG. 1 shows a first embodiment according to the invention.

The block diagram of FIG. 1 includes (on the left) a known DVOR ground station, on the right the known monitoring facility, and in the center the additions in accordance with the invention.

The transmitting facility of the DVOR ground station consists of an oscillator 1, a carrier transmitter 2, and a sideband transmitter 3. The upper and lower sideband signals are fed via a commutator 4 to radiators 5 arranged on a circle. A radiator 6 located in the center of the circle is fed with the carrier-frequency signal over a feeder 7, as well known in this art.

In the prior art type monitoring facilities, a monitor antenna 9 is connected directly to a monitoring circuit 10 (in FIG. 1, this connection is indicated by the dotted line 20). If the limit values to be monitored are exceeded, the monitoring circuit 10 will provide a signal at 21. This signal may cause the transmitting facility to turn off, for example, or it may effect changeover to another transmitting facility. The operation of the DVOR ground station and of the monitoring facility as known in the prior art are generally known and, therefore, will not be described here.

According to the invention, the known monitoring facility is extended by two bridge configurations, e.g. 3 dB hybrids, 11, 12, a controllable phase shifter 13, a control circuit 14, a variable attenuator (variolosser) 15, an adjustable phase shifter 16, and a directional coupler 8.

The first bridge configuration 11 is fed with the carrier and sideband signals received by the monitor antenna 9 and with a carrier signal coupled out of the feeder 7 by the directional coupler 8. In the first bridge configuration 11, the difference between the carrier signal and the signal received by the monitor antenna is formed whereby the carrier is eliminated from the signal received by the antenna; thus, the output signal of this bridge configuration 11, which signal is fed to the controllable phase shifter 13, contains only sidebands. To this end, the phase and the amplitude of the carrier signal coupled out by means of the directional coupler 8 are suitably adjusted in an adjustable phase shifter 15 and in a variable attenuator (variolosser) 16. This adjustment is performed during the installation of the monitoring facility.

The controllable phase shifter 13 compensates for the phase shifts caused by the different path lengths among each of the lateral radiators 5 of the circular array and the monitor antenna 9 in relation to the far field. This phase shifter 13 is controlled synchronously with the rotation of the sideband radiation, but at twice the rotational frequency. This double rotational frequency is generated in the control circuit 14 inserted between the commutator 4 and the controllable phase shifter 13.

If the excited radiators 5 excited at any time lie on the straight line passing through the line containing the center of the circle on which the radiators 11 are arranged and the monitor antenna 9, the phasing for the far field will correspond to the phasing for the near field. If, however, the excited radiators 5 are those located on a perpendicular to this straight line which passes through the center of the circle at any time, the monitor antenna 9 will have the maximum phase error. The phase shift obtained by means of the controllable phase shifter 13, compensating for the phase shifts caused by the different paths, must therefore rise from zero to this maximum value and then decrease to zero again. The maximum value is reached after one fourth of the time of one complete rotation of the radiators. After half a rotation, the initial conditions are present again, i.e., the controllable phase shifter 13 is controlled at twice the rotational frequency. The mganitude of the maximum phase shift is determined by the distance between the monitor antenna 9 and the DVOR ground station and by the diameter of the circle on which the radiators 5 are arranged. If, for example, the circle has a radius of 6.75 m, and the distance between the monitor antenna 9 and the center of the circle is 40 m, the maximum phase error will be about 80°. The maximum phase shift attainable by the controllable phase shifter 13 is so adjusted during the installation of the monitoring facility as to be equal to the maximum possible phase error determined by the above considerations.

In the second bridge configuration 12, which follows the controllable phase shifter 13, the carrier is again added to the phase shifter output signal by summation. The carrier signal required for this purpose is also taken from the variable attenuator 16.

The output signal of the second bridge configuration 12 is equivalent to the far-field signal. It is passed to the monitoring circuit 10, which is designed similarly to an airborne receiver. The monitoring circuit 10 processes the signal in known manner.

Figure 2:
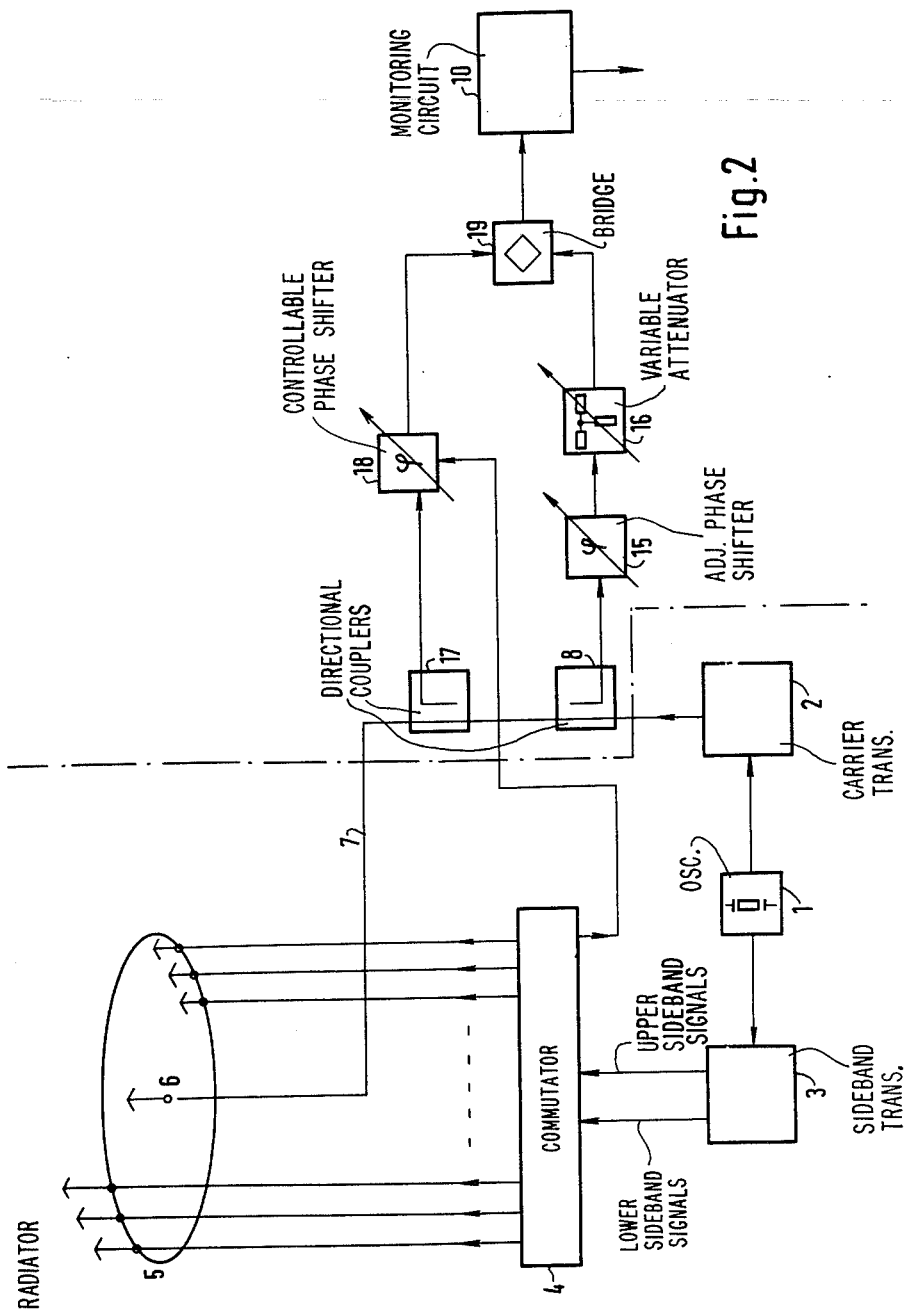
FIG. 2 shows a second embodiment according to the invention.

The second embodiment will now be explained with reference to FIG. 2. Like in the arrangement of FIG. 1, the known DVOR ground station is shown on the left of the block diagram.

In this embodiment, the radiator 6 which radiates the carrier signal is also used as the monitor antenna. Unlike the monitor antenna 9 used in the embodiment of FIG. 1, this monitor antenna 6 receives sideband signals only. These sideband signals are coupled out by means of an additional directional coupler 17 and fed to a controllable phase shifter 18.

Since the monitor antenna 6 is located in the center of the circle on which the radiators 5 are arranged, the travel time of the sideband signals radiated by any of the radiators 5 to the monitor antenna 6 will always be the same. The sideband signals received by the monitor antenna 6 are not frequency-modulated at the rotational frequency. Therefore, they are frequency-modulated by means of the controllable phase shifter 18 in such a manner that the output signal of this phase shifter 18 is frequency-modulated at least at the rotational frequency of the radiators. The phase shifter 18 is controlled by the commutator 4. In a bridge configuration 19, the phase shifter output signal is added to the carrier by summation. As in the embodiment of FIG. 1, the carrier signal required for this purpose is coupled out of the feeder 7 by means of the first directional coupler 8 and adjusted to the appropriate amplitude and proper phase in the variable attenuator 16 and the adjustable phase shifter 15, respectively. The output signal of the bridge configuration 19 is passed to the monitoring circuit 10. In this monitoring circuit 10, the rotational frequency of the radiators being therein filtered out in known manner. The monitoring circuits 10 in both embodiments are of the same prior art form.

The monitoring facility in the embodiment of FIG. 1 is also suitable for use with linear antenna arrays. As in the case of a monitoring facility for circular arrays, the phase shift obtained by means of the controllable phase shifter is so adjusted during the installation of the monitoring facility that the phase shifts caused by different path lengths between the radiators and the monitor antenna with respect to the far field are compensated for.

What is claimed is:

1. In a DVOR ground station system which includes a plurality of first radiators in a generally circular arrangement, commutating means for exciting said radiators according to a predetermined sequence from a sideband transmitter, a second radiator located substantially at the center of said circular arrangement, said second radiator being excited from a carrier transmitter, and a monitor circuit for generating an output signal whenever the radiations of said ground station vary from predetermined signal tolerances, the combination comprising:

antenna first means for intercepting said ground station radiations in the near field and for separating the sideband signals therefrom;

second means responsive to said separated sideband signals and to said commutating means for applying a discrete predetermined phase delay to said sideband signals during the commutation time of each of said first radiators;

and third means for mixing a portion of said carrier with the output of said second means to form a corrected input signal for said monitor circuit approaching the monitor circuit input obtainable if the antenna of said first means were located in the far field.

2. Apparatus according to claim 1 in which said first means includes a monitoring antenna located outside said circular arrangement of first radiators, and a first hybrid responsive to said monitoring antenna and a portion of the carrier generated by said carrier transmitter to provide an output for said first means.

3. Apparatus according to claim 2 including a directional coupler, a variable attenuator and an adjustable phase shifter, and in which said carrier portion is applied to said first hybrid through a directional coupler arranged to divert a relatively small fraction of the output of said carrier transmitter through said variable attenuator and adjustable phase shifter to provide carrier signal phase and amplitude on-site adjustment.

4. Apparatus according to claim 2 in which said second means includes a controllable phase shifter connected to the output of said first hybrid, and also includes means for programming the phase shift provided by said controllable phase shifter at a rate at least equal to the rate of commutation of said first radiators.

5. Apparatus according to claim 4 further including a second hybrid connected to the carrier source terminal of said hybrid and receiving the output of said controllable phase shifter to reintroduce the carrier, the output terminal of said second hybrid constituting the input to said monitor circuit.

6. Apparatus according to claim 4 in which said means for programming said phase shift includes means for controlling said controllable phase shifter rate at twice the rate of said commutator.

7. Apparatus according to claim 1 in which said first means comprises said second radiator and a first directional coupler in series with the feed from said carrier transmitter to said second radiator thereby to employ said second radiator as a carrier transmitting radiator and also as an element for receiving the radiations of said first radiators comprising said sidebands inherently exclusive of said carrier at the output of said first directional coupler.

8. Apparatus according to claim 7 comprising additional means for reintroducing said carrier to the signal at the output of said controllable phase shifter, the output of said additional means comprising the input to said monitoring circuit.

9. Apparatus according to claim 8 in which said additional means for reintroducing said carrier comprises a second directional coupler in the carrier transmitter-to-second radiator feed for diverting a relatively small fraction of the carrier power from said carrier transmitter, and a series adjustable phase shifter and attenuator responsive to said small fraction of carrier power to provide on-site amplitude and phase adjustment and in which a hybrid bridge is provided for mixing said controllable phase shifter and carrier power through said adjustable phase shifter and attenuator to produce an output signal which is said monitor circuit input.

* * * * *